United States Patent
Nakada

(10) Patent No.: US 12,122,462 B2
(45) Date of Patent: Oct. 22, 2024

(54) VEHICLE STEERING SYSTEM

(71) Applicant: JTEKT CORPORATION, Kariya (JP)

(72) Inventor: Yoshio Nakada, Nishitokyo (JP)

(73) Assignee: JTEKT CORPORATION, Kariya (JP)

( * ) Notice: Subject to any disclaimer, the term of this patent is extended or adjusted under 35 U.S.C. 154(b) by 541 days.

(21) Appl. No.: 17/543,216

(22) Filed: Dec. 6, 2021

(65) Prior Publication Data

US 2022/0177025 A1 Jun. 9, 2022

(30) Foreign Application Priority Data

Dec. 9, 2020 (JP) ................. 2020-204008

(51) Int. Cl.
*B62D 5/04* (2006.01)
*B62D 1/20* (2006.01)
*B62D 3/12* (2006.01)

(52) U.S. Cl.
CPC ............. *B62D 5/0403* (2013.01); *B62D 1/20* (2013.01); *B62D 3/12* (2013.01); *B62D 5/0421* (2013.01)

(58) Field of Classification Search
CPC .................................................. B62D 5/0403
See application file for complete search history.

(56) References Cited

U.S. PATENT DOCUMENTS 10,858,036 B2 * 12/2020 Fujita ................... B62D 5/0406
2019/0185047 A1 6/2019 Fujita et al.
2020/0331519 A1 * 10/2020 Urbach ................ B62D 5/0409

FOREIGN PATENT DOCUMENTS

JP 2017136955 A * 8/2017
JP 2019-107926 A 7/2019

* cited by examiner

*Primary Examiner* — Kevin Hurley
(74) *Attorney, Agent, or Firm* — Oliff PLC

(57) ABSTRACT

A vehicle steering system includes a rack shaft, a pinion shaft, a housing including a rack shaft receiving portion and a pinion shaft receiving portion, and a cover member disposed above the pinion shaft receiving portion. A part of the pinion shaft projects upward from an upper end opening of the pinion shaft receiving portion. The cover member includes a hood portion and an annular side wall portion. The pinion shaft is inserted through the hood portion. The side wall portion includes a valve portion capable of coming into abutment with an outer circumferential surface of the pinion shaft receiving portion.

6 Claims, 8 Drawing Sheets

VEHICLE STEERING SYSTEM

CROSS-REFERENCE TO RELATED APPLICATION

This application claims priority to Japanese Patent Application No. 2020-204008 filed on Dec. 9, 2020, incorporated herein by reference in its entirety.

BACKGROUND

1. Technical Field

The disclosure relates to a vehicle steering system.

2. Description of Related Art

A vehicle steering system that turns steered wheels (front wheels) of a vehicle according to a steering operation of a steering wheel by a driver includes a rack shaft with rack teeth formed, a pinion shaft with pinion teeth formed, and a housing that receives respective parts of the rack shaft and the pinion shaft, and the rack teeth and the pinion teeth mesh with each other inside the housing. The rack shaft turns the steered wheels via forward or backward movement in a vehicle width direction. The pinion shaft, a part of which projects upward from the housing, is connected to the steering wheel via an intermediate shaft and a column shaft swingably connected via respective joints.

In a steering system described in Japanese Unexamined Patent Application Publication No. 2019-107926, in order to curb entry of foreign substances such as water and dirt from an upper end opening of a housing, from which a pinion shaft is led out, a cover member is press-fitted on an outer circumference of a part of the pinion shaft, the part being led out from the housing. The cover member covers the upper end opening of the housing and rotates integrally with the pinion shaft. Also, a sealing ring including a sealing material made of rubber is attached to a part inside the housing, the part being in the vicinity of the upper end opening, and the sealing material is in elastic contact with an outer circumferential surface of the pinion shaft. A torque sensor for detecting a steering torque is disposed below the sealing ring.

SUMMARY

Since the steering system is disposed between left and right steered wheels, during, e.g., traveling in rainy weather, the steered wheels sometimes splash the housing and/or the cover member with water. In the steering system configured as above, if water enters from a gap between the cover member and the housing and is accumulated, the surface of the pinion shaft gets rusted at the part that is in elastic contact with the sealing material and a part around that part, which may result in decrease in sealing effectiveness of the sealing ring.

In order to prevent such entry of water, it is conceivable to design the gap between the cover member and the housing to be small; however, in this case, the cover member and the housing may come into constant contact with each other because of a slight dimension error of the cover member or the housing, which may cause, e.g., an increase in rotational resistance generated when the cover member rotates together with the pinion shaft or cause noise to be generated when the cover member rubs on a surface of the housing, and give a feeling of discomfort to, e.g., a driver who hears the noise.

Therefore, an object of the disclosure is to provide a vehicle steering system that enables, when a cover member and a housing are splashed with water, curbing entry of the water to the inside of the housing while securing a sufficient gap between the cover member and the housing.

An aspect of the disclosure provides a vehicle steering system. The vehicle steering system includes: a rack shaft including a rack teeth portion in which rack teeth are formed; a pinion shaft including a pinion teeth portion in which pinion teeth are formed, the pinion teeth meshing with the rack teeth; a housing including a rack shaft receiving portion that receives a part of the rack shaft and a pinion shaft receiving portion that receives a part of the pinion shaft; and a cover member disposed above the pinion shaft receiving portion. The part of the pinion shaft projects upward from an upper end opening of the pinion shaft receiving portion. The cover member includes a disc-like hood portion that covers the upper end opening and an annular side wall portion that faces an outer circumferential surface of the pinion shaft receiving portion across a gap. The pinion shaft is inserted through the hood portion. The side wall portion includes a valve portion capable of coming into abutment with the outer circumferential surface of the pinion shaft receiving portion by being elastically deformed by pressure received from water splashing when a vehicle is traveling.

The above configuration enables, when a cover member and a housing are splashed with water, curbing entry of the water to the inside of the housing while securing a sufficient gap between the cover member and the housing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A first embodiment of the disclosure will be described with reference to the drawings. Note that the below-described embodiments each indicate a preferable specific example in carrying out the disclosure and specifically indicate, by example, various technical matters that are technically preferable; however, the technical scope of the disclosure is not limited to these specific modes.

Overall Configuration of Steering System

Figure 1:
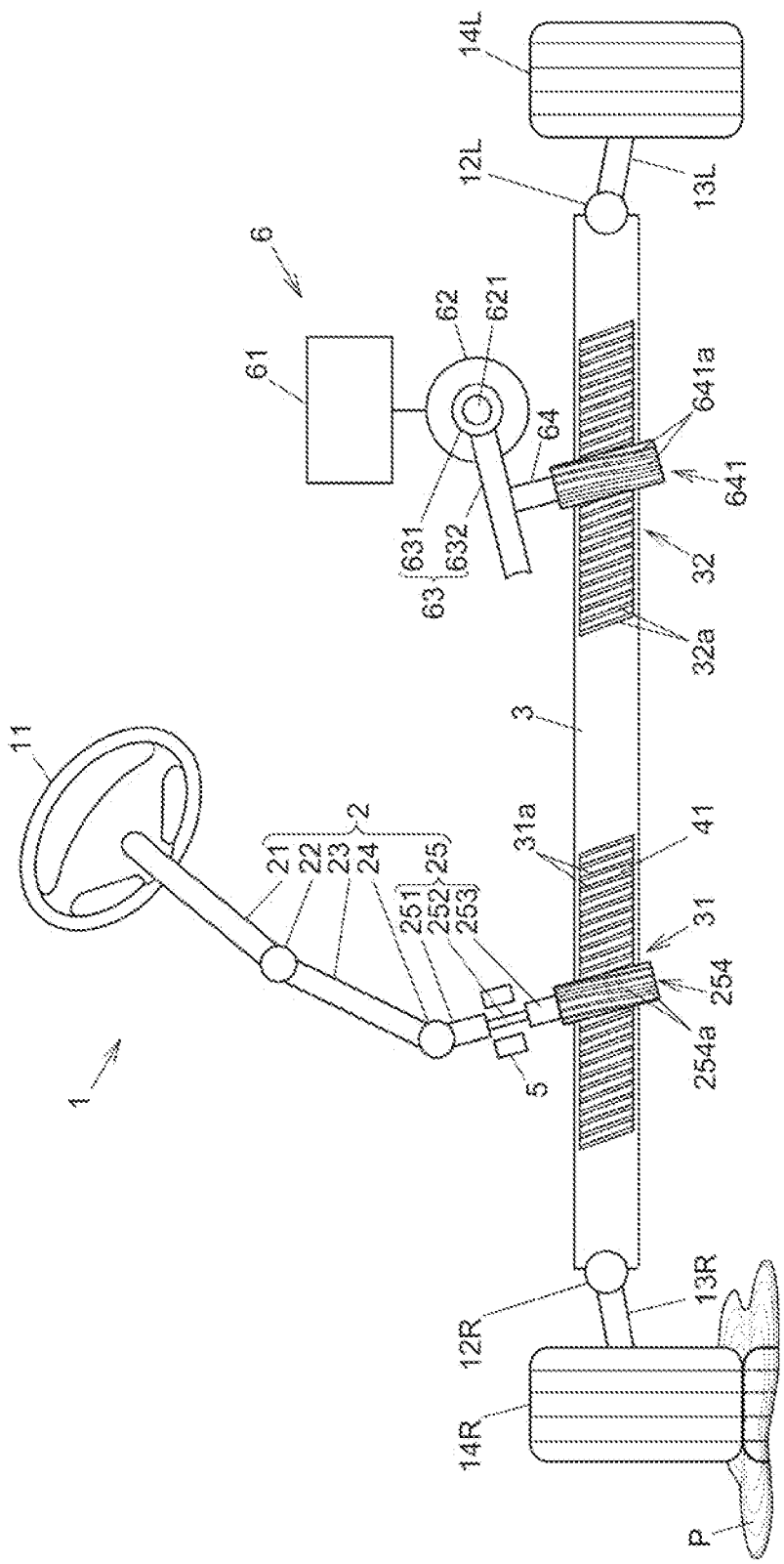
FIG. 1 is an overall configuration diagram schematically illustrating a rack-and-pinion steering system according to a first embodiment of the disclosure.
Figure 2:
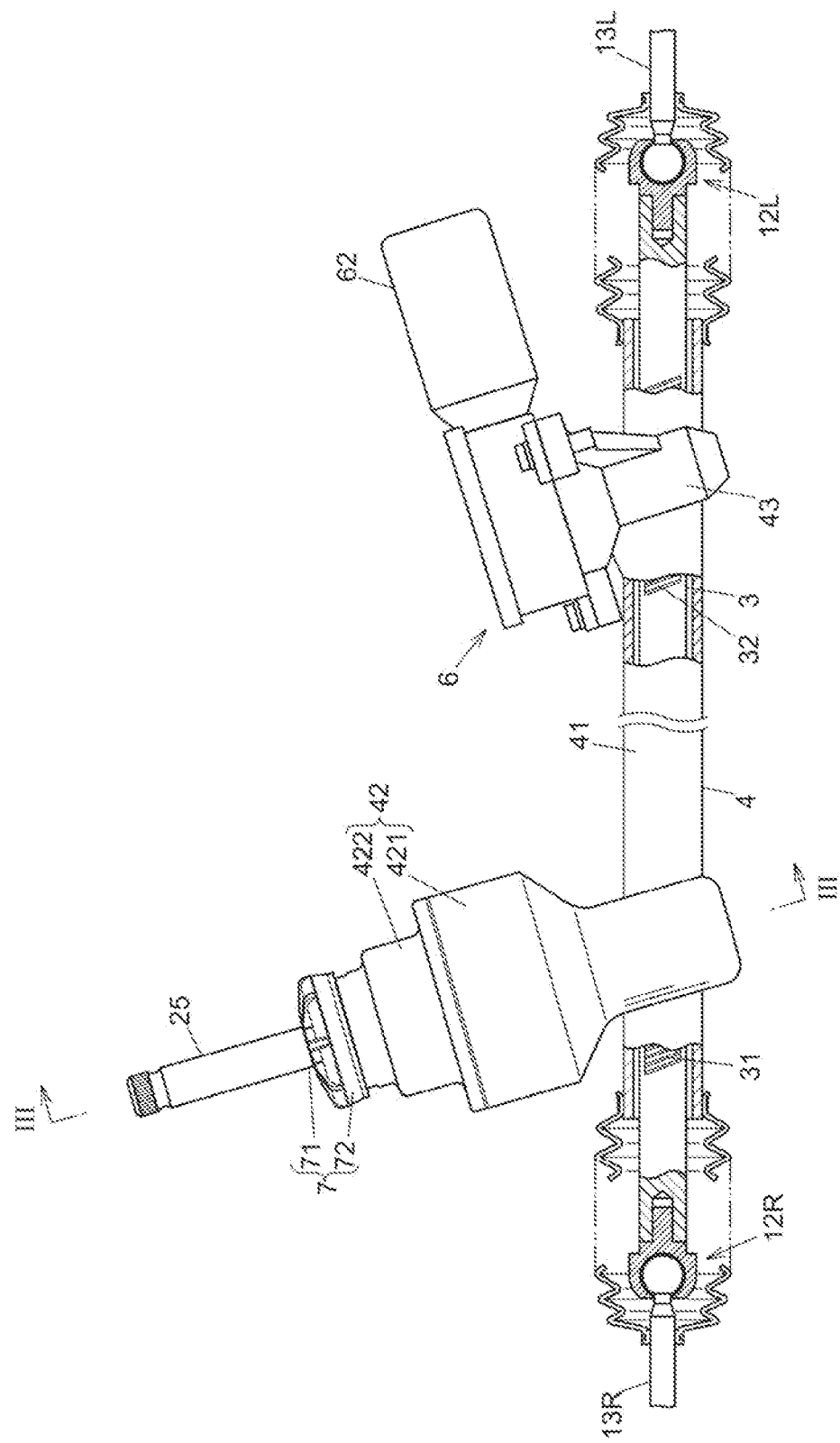
FIG. 2 is an outer appearance diagram illustrating a part of a steering system partially cut away.
Figure 3:
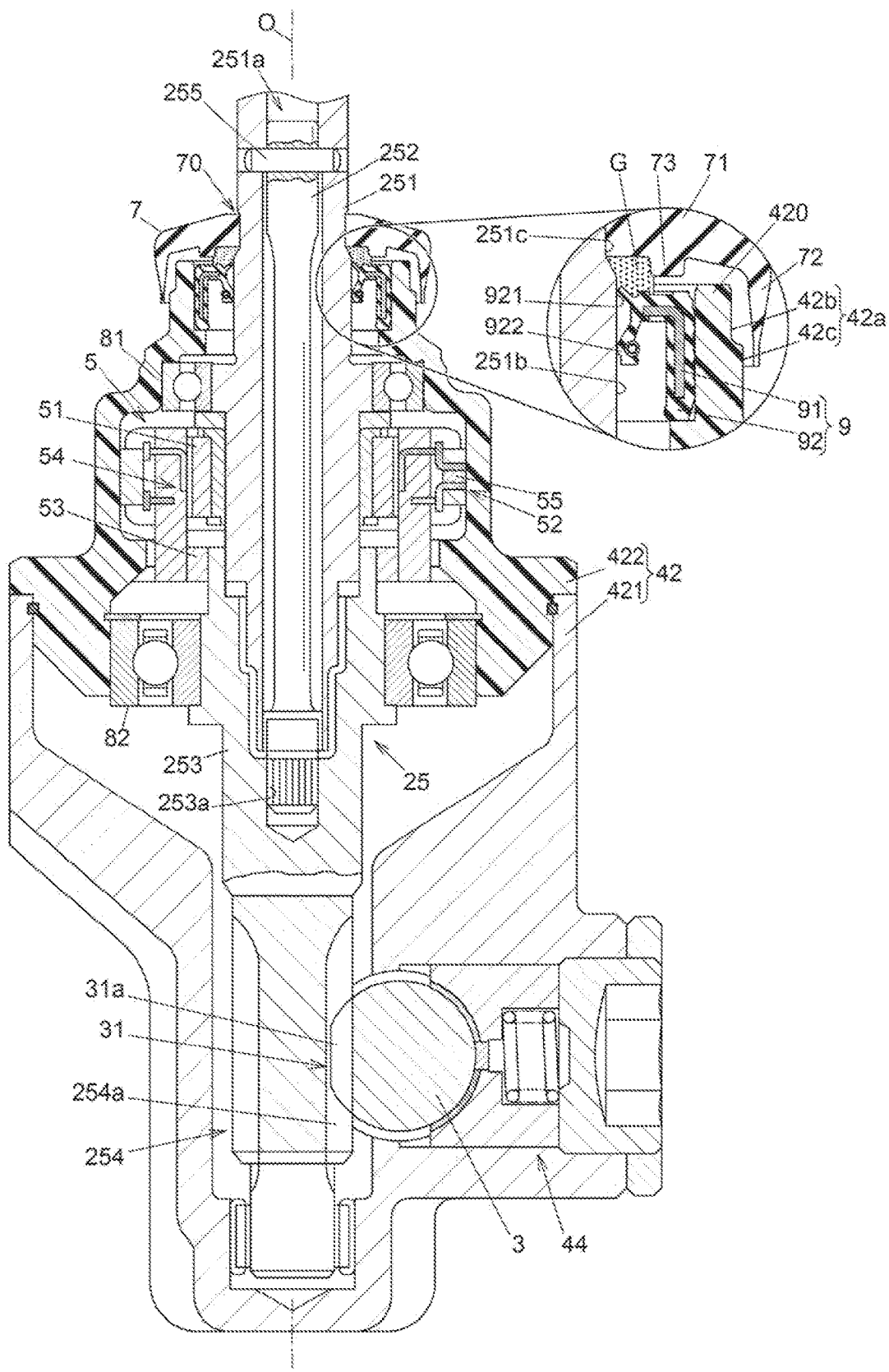
FIG. 3 is a sectional view along line in FIG. 2.

FIG. 1 is an overall configuration diagram schematically illustrating a rack-and-pinion steering system according to a first embodiment of the disclosure. FIG. 2 is an outer appearance diagram illustrating a part of the steering system partially cut away. FIG. 3 is a sectional view along line in FIG. 2. A steering system 1 is mounted in a vehicle and turns front wheels 14L, 14R, which are steered wheels, according to a steering operation by a driver.

FIGS. 1 and 2 illustrate the steering system as viewed from the vehicle front side, and the left side of each of the figures is the right side of the vehicle and the right side of each of the figures is the left side of the vehicle. The letter "R" in a reference sign in FIG. 1 denotes the right side of the vehicle and the letter "L" in a reference sign in FIG. 1 denotes the left side of the vehicle. In the below description, "upper (up)", "lower (down)", "left", and "right" refer to respective directions in a vehicle height direction and a vehicle left-right direction in a state in which the steering system 1 is mounted in a vehicle.

The steering system 1 includes a steering shaft 2 that rotates according to a steering operation of a steering wheel 11 by the driver, a rack shaft 3 extending in the vehicle left-right direction, a housing 4 (see FIG. 2) fixed to a vehicle body, a torque sensor 5 that detects a steering torque, a steering assist device 6 that generates a steering assist force according to the steering torque detected by the torque sensor 5, and a cover member 7 for curbing entry of foreign substances to the inside of the housing 4. The steering shaft 2 includes a column shaft 21 including one end portion to which the steering wheel 11 is fixed, an intermediate shaft 23 connected to the other end portion of the column shaft 21 via a universal joint 22, and a pinion shaft 25 connected to the intermediate shaft 23 via a universal joint 24.

The pinion shaft 25 includes an intermediate shaft 23-side upper member 251, a torsion bar 252 to be twisted by a steering torque, and a lower member 253 connected to the upper member 251 via the torsion bar 252. Also, the pinion shaft 25 includes a pinion teeth portion 254 in which pinion teeth 254a are formed. The pinion teeth portion 254 is provided at a lower end portion of the lower member 253. The upper member 251 and the lower member 253 are formed of a high stiffness metal such as carbon steel, and the torsion bar 252 is formed of a metal such as spring steel having elasticity such that the steel is twisted by a steering torque. The pinion shaft 25 rotates around a rotation axis O (see FIG. 3) along with rotation of the steering wheel 11.

The rack shaft 3 includes a first rack teeth portion 31 in which first rack teeth 31a are formed and a second rack teeth portion 32 in which second rack teeth 32a are formed. The pinion teeth 254a of the pinion shaft 25 mesh with the first rack teeth 31a. Left and right tie rods 13L, 13R are connected to opposite end portions of the rack shaft 3 via ball joints 12L, 12R, respectively. The left and right tie rods 13L, 13R are connected to knuckles that support the left and right front wheels 14L, 14R, respectively. Upon the rack shaft 3 making a forward or backward movement in a vehicle width direction (left-right direction), the left and right tie rods 13L, 13R each swing relative to the rack shaft 3 and the left and right front wheels 14L, 14R are turned, respectively.

The steering assist device 6 includes a control device 61 capable of acquiring a detection signal from the torque sensor 5, an electric motor 62 that generates a steering assist force via a motor current output from the control device 61, a speed reduction mechanism 63 that reduces a speed of rotation of an output shaft 621 of the electric motor 62, and an output shaft 64 to be rotated by a torque of the electric motor 62, the torque being reduced by the speed reduction mechanism 63. The speed reduction mechanism 63 includes a worm gear 631 connected to the output shaft 621 of the electric motor 62 in such a manner as to rotate integrally with the output shaft 621, and a worm wheel 632 that meshes with the worm gear 631. The output shaft 64 includes a pinion teeth portion 641 in which pinion teeth 641a are formed, the pinion teeth 641a meshing with the second rack teeth 32a.

The housing 4 includes a rack shaft receiving portion 41 that receives a part of the rack shaft 3, a pinion shaft receiving portion 42 that receives a part of the pinion shaft 25, and an output shaft receiving portion 43 that receives the output shaft 64 of the steering assist device 6, in an integrated manner. The opposite end portions of the rack shaft 3 project from the rack shaft receiving portion 41 in the left-right direction, and an upper end portion of the pinion shaft 25 projects upward from the pinion shaft receiving portion 42.

As illustrated in FIG. 3, the pinion shaft receiving portion 42 includes a base portion 421 made of a metal such as an aluminum alloy, the base portion 421 being molded integrally with the rack shaft receiving portion 41, and a holder portion 422 made of a resin, the holder portion 422 being attached to the upper side of the base portion 421. The first rack teeth portion 31 of the rack shaft 3 is elastically pushed against the pinion teeth portion 254 of the pinion shaft 25 by a rack guide mechanism 44 provided in the base portion 421.

The holder portion 422 is formed of, for example, a resin, such as polypropylene, having stiffness enhanced by addition of glass fiber, and is formed in a cylindrical shape with the rotation axis O as a center. The holder portion 422 holds the torque sensor 5, first and second bearings 81, 82, and a sealing ring 9 inside. Each of the first and second bearings 81, 82 is a ball bearing with a plurality of balls disposed as rolling elements between an inner ring and an outer ring. The first bearing 81 supports the upper member 251 on the upper side of the torque sensor 5 and the second bearing 82 supports the lower member 253 on the lower side of the torque sensor 5.

A shaft hole 251a is formed in a center portion of the upper member 251, and an upper end portion of the torsion bar 252 is received inside the shaft hole 251a. The torsion bar 252 is fixed to the upper member 251 by a fixing pin 255 in such a manner as to be non-rotatable relative to the upper member 251. A lower end portion of the torsion bar 252 is fixed to the lower member 253 in such a manner as to be non-rotatable relative to the lower member 253, via spline-fitting of the lower end portion in a fitting hole 253a formed in the lower member 253.

The torque sensor 5 includes a ring magnet 51 fixed to the upper member 251, a magnetism collection ring assembly 52 fixed to the holder portion 422, a magnetic yoke assembly 54 fixed to the lower member 253 by an annular collar 53, and a magnetic field detection element 55. Upon the torsion bar 252 being twisted by a steering torque, the ring magnet 51 and the magnetic yoke assembly 54 turn relative to each other and an intensity of a magnetic field passing through the magnetism collection ring assembly 52 varies. Then, the steering torque is detected by the magnetic field intensity variation being captured by the magnetic field detection element 55.

The sealing ring 9 includes a core metal 91 and a sealing rubber 92 and is fixedly fitted to the inner side of the holder portion 422 on the upper side relative to the first bearing 81. The sealing rubber 92 includes first and second sealing lips 921, 922 that come into sliding contact with an outer circumferential surface 251b of the upper member 251 of the pinion shaft 25, curbing entry of foreign substances (including liquids and solids) from an upper end opening 420 of the pinion shaft receiving portion 42 to the inside of the pinion shaft receiving portion 42. The upper end opening 420 is an end portion on the vertically upper side of the holder portion 422.

A part of the upper member 251 of the pinion shaft 25 projects upward from the upper end opening 420 of the pinion shaft receiving portion 42. The cover member 7 is disposed above the pinion shaft receiving portion 42, and grease G is injected between the sealing ring 9 and the cover member 7. The grease G covers an entire circumference of a part, between the sealing ring 9 and the cover member 7, of the outer circumferential surface 251b of the upper member 251.

Figure 4A:
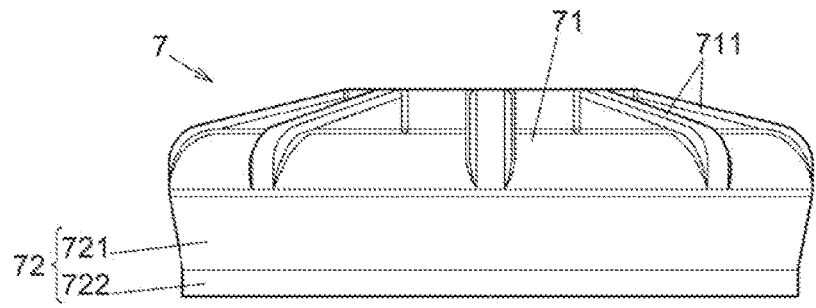
FIG. 4A is a side view of a cover member.
Figure 4B:
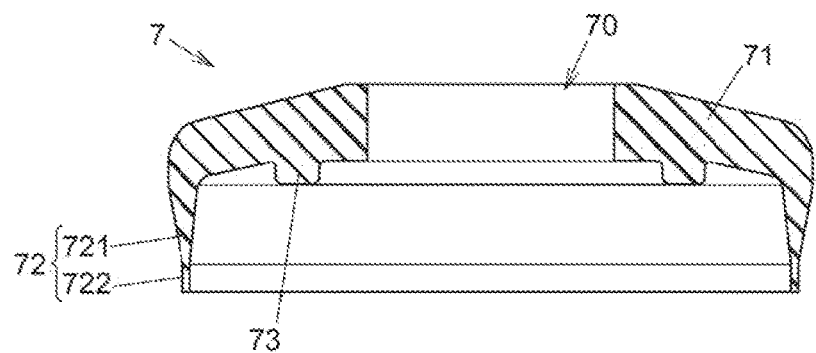
FIG. 4B is a sectional view of the cover member.
Figure 4C:
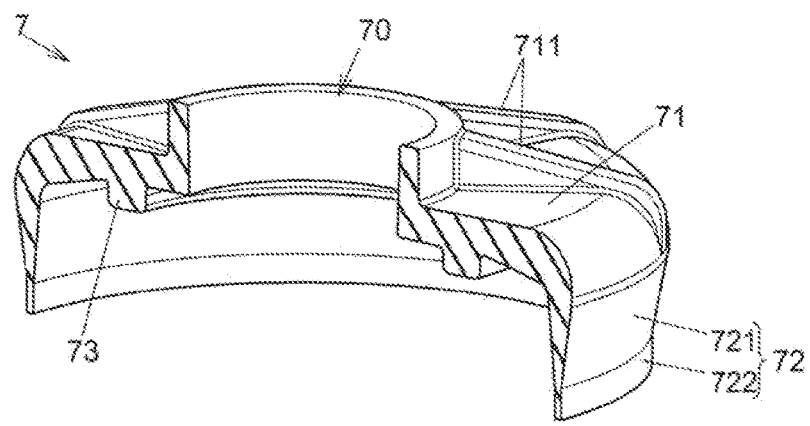
FIG. 4C is a sectional perspective view of the cover member.

FIG. 4A is a side view of the cover member 7 and FIG. 4B is a sectional view of the cover member 7. FIG. 4C is a sectional perspective view of the cover member 7. The cover member 7 is formed of, for example, rubber such as acrylonitrile-butadiene rubber (NBR), and includes a disc-like hood portion 71 that covers the upper end opening 420 of the pinion shaft receiving portion 42, an annular side wall portion 72 that faces a part, in the vicinity of the upper end opening 420, of the outer circumferential surface 42a (illustrated in FIG. 3) of the pinion shaft receiving portion 42 across a gap, and an annular weir portion 73 provided on the lower side of the hood portion 71, in an integrated manner. A through-hole 70 is formed in a center portion of the hood portion 71 and the upper member 251 of the pinion shaft 25 is inserted through the through-hole 70. A plurality of ribs 711 for strength and stiffness enhancement are provided at the hood portion 71. The weir portion 73 curbs an escape of the grease G.

In a part of the outer circumferential surface 251b of the upper member 251, the part projecting upward from the upper end opening 420 of the pinion shaft receiving portion 42, an annular groove 251c that extends circumferentially is formed. The cover member 7 is axially positioned relative to and fixed to the pinion shaft 25 by the hood portion 71 being fitted in the groove 251c, and rotates together with the pinion shaft 25. For example, when the front wheel 14R runs through a puddle P (illustrated in FIG. 1), the cover member 7 and a part around the cover member 7 are splashed with water by the front wheel 14R.

Figure 5A:
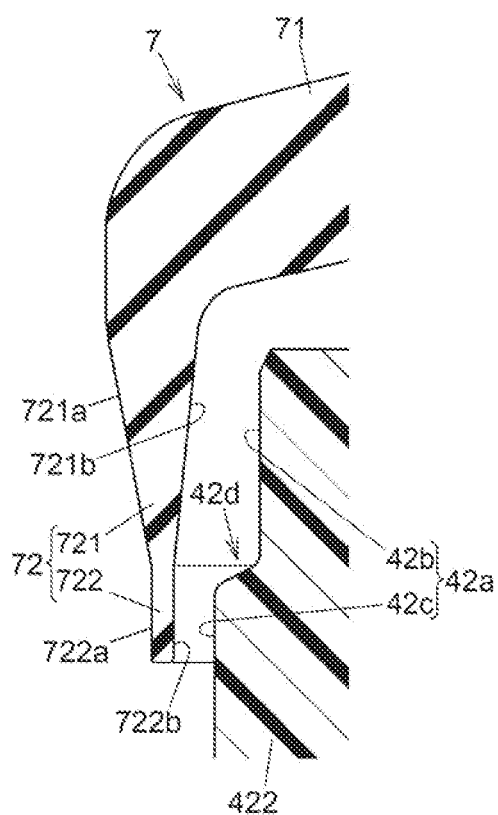
FIG. 5A is a sectional view illustrating a part around a side wall portion of the cover member in normal times.
Figure 5B:
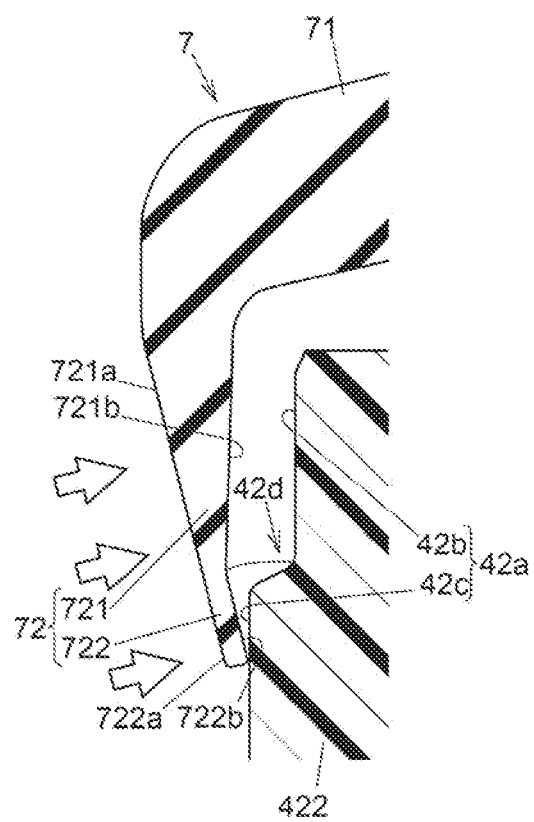
FIG. 5B is a sectional view illustrating the part around the side wall portion of the cover member when splashed with water.

FIG. 5A is an enlarged sectional view of a part around the side wall portion 72 of the cover member 7 in normal times and FIG. 5B is a sectional view illustrating that part when splashed with water. The side wall portion 72 includes a cylindrical base portion 721 that extends downward from an outer edge of the hood portion 71, and a valve portion 722 provided under the base portion 721. The valve portion 722 has a cylindrical shape that is thinner than the base portion 721, and is capable of coming into abutment with the outer circumferential surface 42a of the pinion shaft receiving portion 42 by being elastically deformed by pressure received from water splashing when the vehicle is traveling. FIG. 5B illustrates a state in which a lower end portion of the valve portion 722 is in abutment with the outer circumferential surface 42a of the pinion shaft receiving portion 42.

Also, in FIG. 5B, as an example, a direction in which water splashes via the front wheel 14R is indicated by a plurality of arrows.

The base portion 721 is higher in stiffness than the valve portion 722 and includes a lower end portion that decreases in thickness toward the valve portion 722 side. At least a part of an outer circumferential surface of the base portion 721 is an outer tapered surface 721a that decreases in outer diameter toward the lower side, and at least a part of an inner circumferential surface of the base portion 721 is an inner tapered surface 721b that increases in inner diameter toward the lower side. In other words, the base portion 721 more decreases in stiffness as farther in the lower end portion, and thus, is easily deformed radially inward by pressure received from water splashing on the outer tapered surface 721a.

In normal times in which no water splashes, an outer circumferential surface 722a and an inner circumferential surface 722b of the valve portion 722 are parallel to the rotation axis O. The outer circumferential surface 722a of the valve portion 722 is continuous with the outer tapered surface 721a of the base portion 721 and the inner circumferential surface 722b of the valve portion 722 is continuous with the inner tapered surface 721b of the base portion 721. A part, inside the side wall portion 72, of the outer circumferential surface 42a of the pinion shaft receiving portion 42 has a stepped shape in which an outer diameter of a small-diameter portion 42b facing the inner tapered surface 721b of the base portion 721 is smaller than an outer diameter of a large-diameter portion 42c facing the inner circumferential surface 722b of the valve portion 722 and a step portion 42d is formed between the small-diameter portion 42b and the large-diameter portion 42c.

In the steering system 1 configured as above, the valve portion 722 of the cover member 7 is elastically deformed by pressure received from water splashing when the vehicle is traveling, curbing entry of the water to the inside of the cover member 7. Also, where the pressure of the water is high, the valve portion 722 comes into abutment with the outer circumferential surface 42a of the pinion shaft receiving portion 42 and entry of the water from the part of the abutment is thus prevented, enabling curbing entry of the water to the inside of the cover member 7 even where the pressure of the water is high.

Also, in the present embodiment, the base portion 721 includes the outer tapered surface 721a, and thus, the base portion 721 easily receives pressure of water via the outer tapered surface 721a and thus easily elastically deforms inward. Then, in the part in which the base portion 721 has elastically deformed, the valve portion 722 becomes closer to the outer circumferential surface 42a of the pinion shaft receiving portion 42, and thus, the valve portion 722 more easily comes into abutment with the outer circumferential surface 42a of the pinion shaft receiving portion 42.

Furthermore, in the present embodiment, the base portion 721 includes the inner tapered surface 721b, which makes the base portion 721 more decrease in thickness and stiffness as farther in the lower end portion in combination with the outer tapered surface 721a, and thus, in particular, the base portion 721 more easily elastically deforms as farther in the lower end portion. Therefore, the valve portion 722 even more easily comes into abutment with the outer circumferential surface 42a of the pinion shaft receiving portion 42.

Even where the cover member 7 includes no valve portion 722, in an early state of use in which there is a sufficient amount of a gel lubricant such as the grease G covering the part, between the sealing ring 9 and the hood portion 71 of the cover member 7, of the outer circumferential surface 251b of the pinion shaft 25 (state illustrated in FIG. 3), even if water enters the inside of the cover member 7, rusting of the outer circumferential surface 251b of the upper member 251 can be prevented by a waterproof effect and an antirust effect of the grease G; however, if water repeatedly enters the inside of the cover member 7 and a flow rate and a flow volume of the entered water are large, the grease G is swept away by the water and the outer circumferential surface 251b of the upper member 251 easily gets rusted. If the outer circumferential surface 251b of the upper member 251 is rusted, sealing effectiveness of the sealing ring 9 may decrease. In particular, if the rust spreads from the area of the outer circumferential surface 251b, the area being previously covered by the grease G, to an area of the outer circumferential surface 251b, the sealing lips 921, 922 of the sealing ring 9 being in contact with the area, along with rotation of the pinion shaft 25, the sealing lips 921, 922 are worn by the rust, which may result in decrease in sealing effectiveness of the sealing ring 9. In the present embodiment, entry of water to the inside of the cover member 7 can be curbed by the valve portion 722, enabling securing the amount of the grease G for a long period of time and thus enabling prevention of rusting. As a result, the sealing lips 921, 922 can be prevented from becoming worn, enabling maintaining the sealing effectiveness of the sealing ring 9 for a long period of time.

Second Embodiment

Next, a second embodiment of the disclosure will be described with reference to FIGS. 6A and 6B. In the second embodiment, a shape of a cover member 7A is different from the shape of the cover member 7 according to the first embodiment. Since the rest of the configuration is similar to that of the first embodiment, in FIGS. 6A and 6B, components that are in common with the first embodiment are provided with reference signs that are the same as those provided in FIG. 3, etc., and overlapping descriptions thereof will be omitted.

Figure 6A:
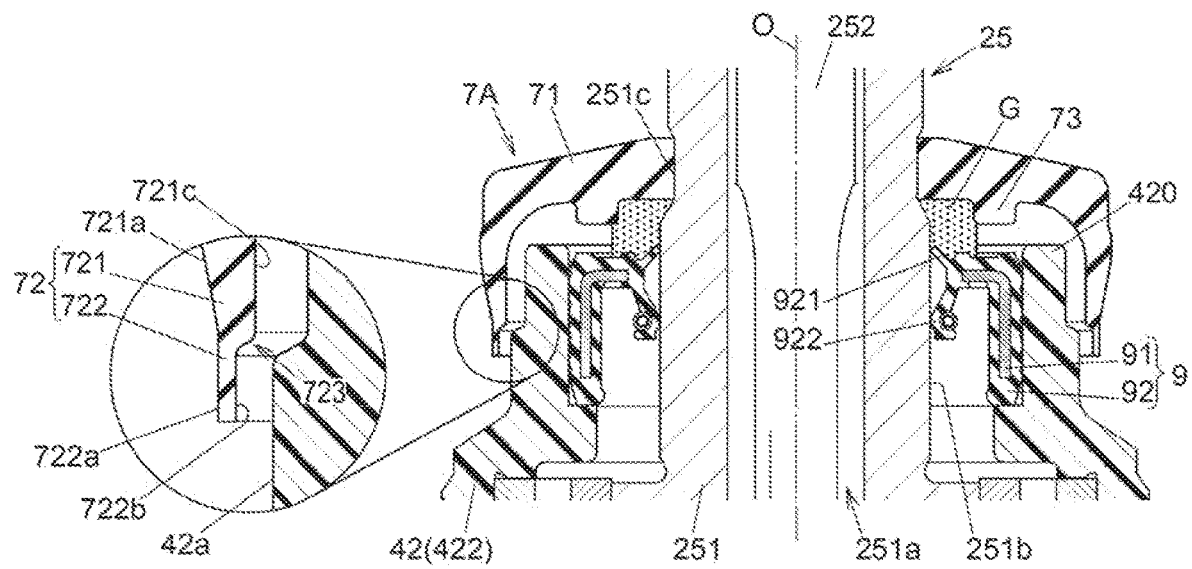
FIG. 6A is a sectional view illustrating a cover member according to a second embodiment in a normal state.
Figure 6B:
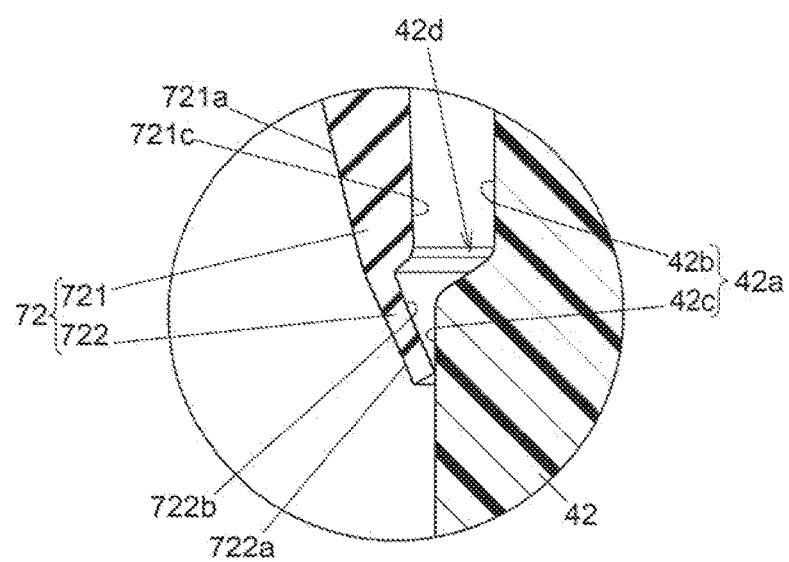
FIG. 6B is a sectional view illustrating a part around the cover member when splashed with water.

FIG. 6A is a sectional view illustrating a part around a cover member 7A in normal times and FIG. 6B is a sectional view illustrating a part around the cover member 7A when splashed with water. As with the cover member 7 according to the first embodiment, the cover member 7A according to the present embodiment includes a hood portion 71 and a side wall portion 72, and the side wall portion 72 includes a base portion 721 and a valve portion 722; however, in normal times in which no water splashes, an inner circumferential surface 721c of the base portion 721 is parallel to a rotation axis O of a pinion shaft 25. An inner diameter of the base portion 721 is smaller than an inner diameter of the valve portion 722, and a step portion 723 is formed entirely circumferentially between the inner circumferential surface 721c of the base portion 721 and an inner circumferential surface 722b of the valve portion 722.

As with the first embodiment, the cover member 7A according to the second embodiment also enables entry of water splashing when a vehicle is traveling to the inside of the cover member 7A to be curbed by the valve portion 722 being elastically deformed by pressure received from the water.

Third Embodiment

Next, a third embodiment of the disclosure will be described with reference to FIGS. 7A and 7B. In the third embodiment, a shape of a cover member 7B is different from the shape of the cover member 7 according to the first embodiment. Since the rest of the configuration is similar to that of the first embodiment, in FIGS. 7A and 7B, components that are in common with the first embodiment are provided with reference signs that are the same as those provided in FIG. 3, etc., and overlapping descriptions thereof will be omitted.

Figure 7A:
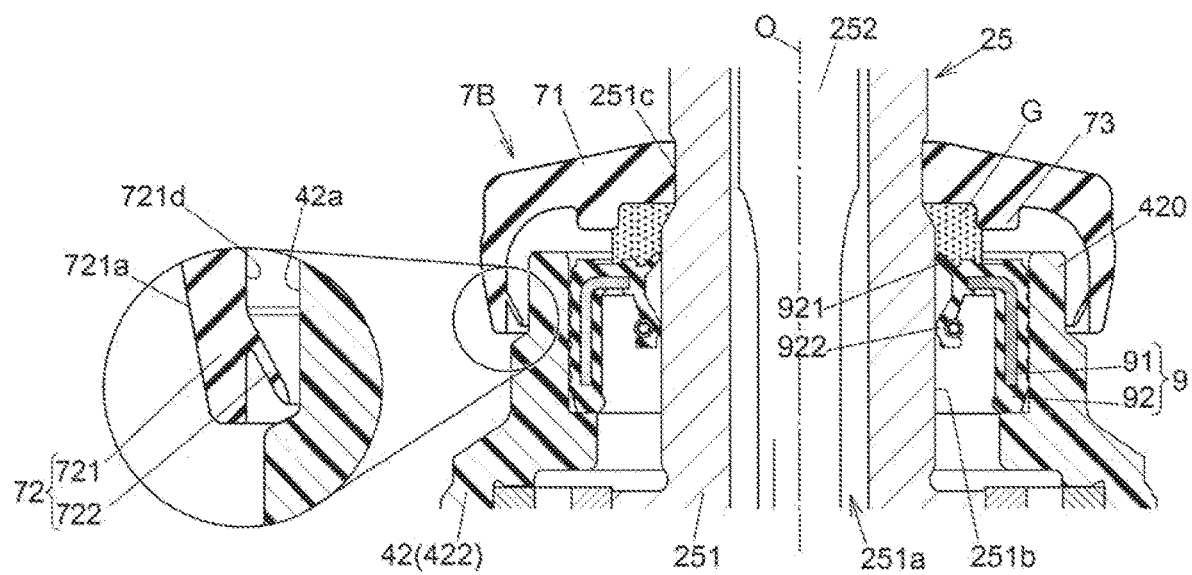
FIG. 7A is a sectional view illustrating a cover member according to a third embodiment in a normal state.
Figure 7B:
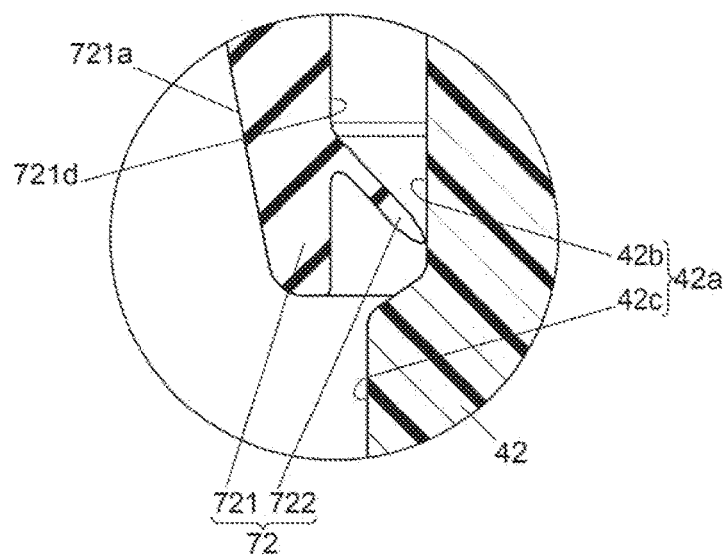
FIG. 7B is a sectional view illustrating a part around the cover member when splashed with water.

FIG. 7A is a sectional view illustrating a part around a cover member 7B in normal times and FIG. 7B is a sectional view illustrating a part around the cover member 7B when splashed with water. As with the cover member 7 according to the first embodiment, the cover member 7B according to the present embodiment includes a hood portion 71 and a side wall portion 72 and the side wall portion 72 includes a base portion 721 and a valve portion 722; however, the valve portion 722 is annularly provided on the inner side of the base portion 721 and faces a small-diameter portion 42b in an outer circumferential surface 42a of a pinion shaft receiving portion 42. The valve portion 722 projects radially inward from an inner circumferential surface 721d of the base portion 721 and projects toward the lower side in FIG. 7A and has a tapered shape that decrease in inner and outer diameters toward the lower end portion side.

The valve portion 722 is not in abutment with the outer circumferential surface 42a of the pinion shaft receiving portion 42 in normal times, and upon being splashed with water when a vehicle is traveling, the valve portion 722 is elastically deformed by pressure of the water, and as illustrated in FIG. 7B, the lower end portion comes into abutment with the outer circumferential surface 42a of the pinion shaft receiving portion 42. Consequently, entry of the water to the upper side relative to the valve portion 722 can be curbed.

As with the first embodiment, the cover member 7B according to the third embodiment also enables entry of water splashing when the vehicle is traveling to the inside of the cover member 7B to be curbed by the valve portion 722 being elastically deformed by pressure received from the water.

Supplement

Although the disclosure has been described above based on the first to third embodiments, these embodiments are not intended to limit the disclosure according to the claims. Also, it should be noted that all the combinations of the features described in the embodiments are not necessarily essential for achieving the object of the disclosure. Also, the disclosure can be carried out in such a manner as to be appropriately altered by omission of some of the components or addition or replacement of components without departing from the spirit of the disclosure. Furthermore, some components from the above-described first to third embodiments can be combined with one another, and, for example, the following alterations are possible.

Although the above first to third embodiments have been described in terms of the case where the holder portion 422 of the pinion shaft receiving portion 42 is made of a resin, the holder portion 422 may be made of a metal such as an aluminum alloy like the base portion 421. Also, although the above first to third embodiments have been described in terms of the case where the torque sensor 5 is disposed below the sealing ring 9 in the pinion shaft receiving portion 42, no torque sensor 5 may be disposed in the pinion shaft receiving portion 42.

Also, in the cover member 7 according to the first embodiment or the cover member 7B according to the second embodiment, as with the third embodiment, a valve portion 722 may further be provided on the inner side of the base portion 721. Furthermore, a plurality of valve portions 722 of the third embodiment may be provided in such a manner as to be aligned along the height direction on the inner side of the base portion 721. Although the first to third embodiments each indicate the steering system 1 in which the components from the steering wheel 11 to the pinion shaft 25 are mechanically connected, the disclosure may be applied also to a steer-by-wire apparatus in which components from a steering wheel to a pinion shaft are connected via a clutch capable of being engaged and disengaged or a steer-by-wire apparatus including no mechanism that connects components from a steering wheel to a pinion shaft.

What is claimed is:

1. A vehicle steering system comprising:
   a rack shaft including a rack teeth portion in which rack teeth are formed;
   a pinion shaft including a pinion teeth portion in which pinion teeth are formed, the pinion teeth meshing with the rack teeth;
   a housing including a rack shaft receiving portion that receives a part of the rack shaft and a pinion shaft receiving portion that receives a part of the pinion shaft; and
   a cover member disposed above the pinion shaft receiving portion, wherein
   the part of the pinion shaft projects upward from an upper end opening of the pinion shaft receiving portion,
   the cover member includes a disc-like hood portion that covers the upper end opening and an annular side wall portion that faces an outer circumferential surface of the pinion shaft receiving portion across a gap,
   the pinion shaft is inserted through the hood portion, and
   the side wall portion includes a valve portion capable of coming into abutment with the outer circumferential surface of the pinion shaft receiving portion by being elastically deformed by pressure received from water splashing when a vehicle is traveling.

2. The vehicle steering system according to claim 1, wherein
   the side wall portion includes a cylindrical base portion that is higher in stiffness than the valve portion, and
   the valve portion is provided under the base portion.

3. The vehicle steering system according to claim 1, wherein
   the side wall portion includes a cylindrical base portion that is higher in stiffness than the valve portion, and
   the valve portion is provided on an inner side of the base portion.

4. The vehicle steering system according to claim 2, wherein at least a part of an outer circumferential surface of the base portion is a tapered surface having an outer diameter that decreases toward a lower side.

5. The vehicle steering system according to claim 3, wherein at least a part of an outer circumferential surface of the base portion is a tapered surface having an outer diameter that decreases toward a lower side.

6. The vehicle steering system according to claim 1, further comprising a seal fixedly fitted to an inner side of the pinion shaft receiving portion and disposed below the cover member, wherein
   the seal includes a sealing lip that is in sliding contact with an outer circumferential surface of the pinion shaft, and
   a lubricant is injected in such a manner as to cover a part, between the seal and the hood portion, of the outer circumferential surface of the pinion shaft.

* * * * *